(12) United States Patent
Mii et al.

(10) Patent No.: US 11,784,720 B2
(45) Date of Patent: Oct. 10, 2023

(54) OPTICAL MODULE

(71) Applicants: Sumitomo Electric Industries, Ltd., Osaka (JP); Sumitomo Electric Device Innovations, Inc., Yokohama (JP)

(72) Inventors: Kazuaki Mii, Osaka (JP); Kyohei Maekawa, Osaka (JP); Hiroshi Hara, Osaka (JP); Toru Hirayama, Yokohama (JP); Ryouta Teranishi, Yokohama (JP)

(73) Assignees: Sumitomo Electric Industries, Ltd., Osaka (JP); Sumitomo Electric Device Innovations, Inc., Yokohama (JP)

( * ) Notice: Subject to any disclaimer, the term of this patent is extended or adjusted under 35 U.S.C. 154(b) by 0 days.

(21) Appl. No.: 17/675,116

(22) Filed: Feb. 18, 2022

(65) Prior Publication Data

US 2022/0271843 A1 Aug. 25, 2022

(30) Foreign Application Priority Data

Feb. 19, 2021 (JP) .................................. 2021-025188
Jan. 7, 2022 (JP) .................................. 2022-001720

(51) Int. Cl.
*H04B 10/60* (2013.01)
*G02B 6/42* (2006.01)
*H04B 10/40* (2013.01)
*H04B 10/50* (2013.01)

(52) U.S. Cl.
CPC ........... *H04B 10/60* (2013.01); *G02B 6/4204* (2013.01); *H04B 10/40* (2013.01); *H04B 10/50* (2013.01)

(58) Field of Classification Search
None
See application file for complete search history.

(56) References Cited

U.S. PATENT DOCUMENTS

| 7,478,953 B2* | 1/2009 | Tanaka | G02B 6/4246 |
| | | | 398/139 |
| 2005/0163439 A1* | 7/2005 | Vanniasinkam | G02B 6/4292 |
| | | | 385/94 |
| 2005/0185882 A1* | 8/2005 | Zack | G02B 6/4256 |
| | | | 385/15 |

(Continued)

FOREIGN PATENT DOCUMENTS

JP 2009-198958 A 9/2009

*Primary Examiner* — Darren E Wolf
(74) *Attorney, Agent, or Firm* — McCarter & English, LLP; Michael A. Sartori

(57) ABSTRACT

An optical module of the present disclosure includes an optical element, a first optical component that is optically coupled to the optical element, a second optical component that is optically coupled to the first optical component, a receptacle to which an optical fiber that transmits the incident light to the second optical component is connected, a terminal unit that electrically outputs an output signal of the optical element to the outside, and a package that accommodates the optical element, the first optical component, and the second optical component and is provided with the receptacle on a first surface and the terminal unit on a second surface facing the first surface, wherein the wiring extends from the first surface side to the second surface side and electrically connects the second optical component and the terminal unit.

9 Claims, 8 Drawing Sheets

(56) References Cited

U.S. PATENT DOCUMENTS

| | | | |
|---|---|---|---|
| 2007/0054517 A1* | 3/2007 | Hidaka | H05K 1/0281 439/79 |
| 2009/0052898 A1* | 2/2009 | Oki | H05K 1/189 398/79 |
| 2009/0123157 A1* | 5/2009 | Moore | G02B 6/4277 361/748 |
| 2009/0269077 A1* | 10/2009 | Sone | H04B 10/40 398/135 |

* cited by examiner

OPTICAL MODULE

CROSS-REFERENCE TO RELATED APPLICATIONS

This application is based upon and claims the benefit of priority from Japanese Patent Application No. 2021-025188, filed on Feb. 19, 2021 and Japanese Patent Application No. 2022-001720, filed on Jan. 7, 2022, the entire contents of which are incorporated herein by reference.

TECHNICAL FIELD

The present disclosure relates to an optical module.

BACKGROUND ART

In recent years, due to the demand for higher communication speeds, optical modules used in optical transceivers and the like are required to support transmission speeds of 40 Gbps and 100 Gbps. In such high-speed transmission, wavelength multiplexed light beam in which a plurality of signal light beams having different wavelengths are wavelength-multiplexed is often used. For example, in the optical module disclosed in JP-A-2009-198958, various optical elements and light-receiving elements are mounted in a package.

SUMMARY OF INVENTION

As shown in FIG. 8, the optical receiving module 80 of JP-A-2009-198958 is provided with a convergent lens unit 81, an optical demultiplexing unit 82, a wavelength separation unit 83, a converging lens 84, and a light-receiving unit 85 on an optical base in a package.

When adding more optical elements in the package to enhance the functionality of the optical receiving module, the optical receiving module described in JP-A-2009-198958 has restrictions on the layout of the optical elements to be added and there is a problem that the distance to route the wiring wire becomes long. For example, when a mechanical vibration of several kHz is applied to an optical receiving module whose wire length exceeds 4 mm, the frequency of the mechanical vibration matches the natural frequency of the wire, resulting in the wire breakage due to the resonance or short circuit in the wire. Therefore, it is necessary to shorten the wire length to 4 mm or less.

The present disclosure has been made in view of these circumstances and an object thereof is to provide an optical module in which the degree of freedom in the layout of each member including the optical element in the optical module is increased, the layout of each member can be reduced in space, and further, the length of the wiring wire can be shortened.

An optical module of the present disclosure includes an optical element; a first optical component that is optically coupled to the optical element; a second optical component that is optically coupled to the first optical component; a wiring circuit board in which wiring is provided on a main surface thereof and the first optical component is arranged on a back surface on the opposite side of the main surface; a receptacle to which an optical fiber that transmits the incident light to the second optical component is connected; a terminal unit that electrically outputs an output signal of the optical element to the outside; and a package that accommodates the optical element, the first optical component, and the second optical component and is provided with the receptacle on a first surface and the terminal unit on a second surface facing the first surface, wherein the wiring extends from the first surface side to the second surface side and electrically connects the second optical component and the terminal unit.

According to the present disclosure, the degree of freedom in the layout of each member including an optical element in an optical module can be increased, the layout of each member can be reduced in space, and the length of the wiring wire can be shortened.

DESCRIPTION OF EMBODIMENTS

[Description of Embodiments of Present Disclosure]

Figure 1A:
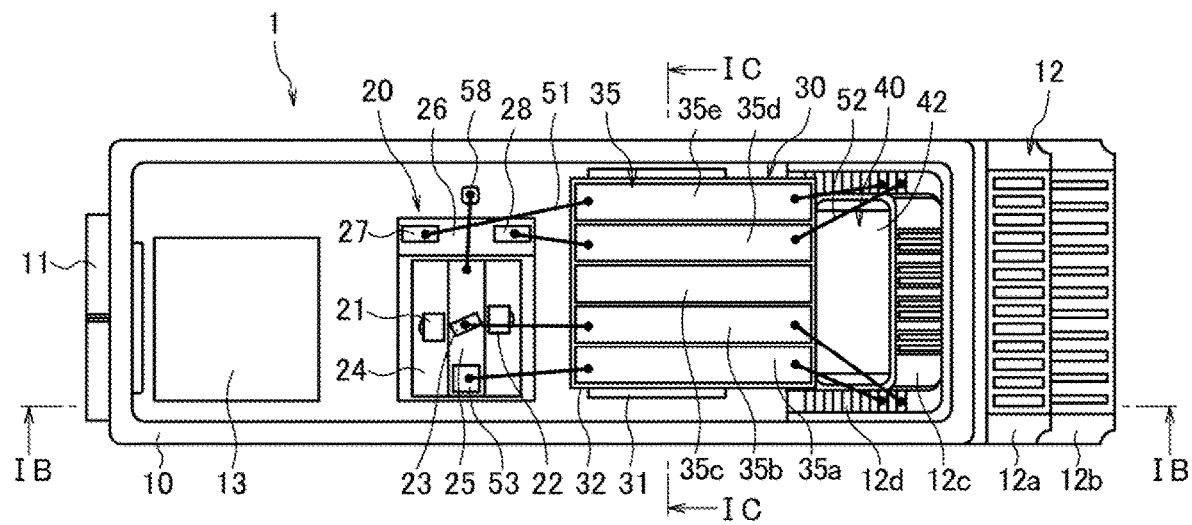
FIG. 1A is a perspective plan view of an optical module according to a first embodiment of the present disclosure.

First, embodiments of the present disclosure will be listed and described.

(1) An optical module according to the present disclosure includes an optical element, a first optical component that is optically coupled to the optical element, a second optical component that is optically coupled to the first optical component, a wiring circuit board in which wiring is provided on a main surface thereof and the first optical component is arranged on a back surface on the opposite side of the main surface, a receptacle to which an optical fiber that transmits the incident light to the second optical component is connected, a terminal unit that electrically outputs an output signal of the optical element to the outside, and a package that accommodates the optical element, the first optical component, and the second optical component and is provided with the receptacle on a first surface and the terminal unit on a second surface facing the first surface, in which the wiring extends from the first surface side to the second surface side and electrically connects the second optical component and the terminal unit. Here, the optical element may be a light-receiving element or a light-emitting element, for example, a VCSEL which is a surface light-emitting element. The first optical component is, for example, an optical demultiplexer when the optical element is a light-receiving element, and, for example, an optical multiplexer that multiplexes light output from a plurality of light-emitting elements can be used when the optical element is a light-emitting element.

As a result, the second optical component and the terminal unit can be electrically connected to each other by using a wiring extending from the first surface side to the second surface side and electrically connecting the second optical component and the terminal unit. Therefore, it is possible to have a layout in which the first optical component is arranged between the second optical component and the terminal unit, and it is also possible to reduce space in the layout of each member. Further, even in such a layout, since the second optical component and the terminal unit are electrically connected to each other by using the wiring, the length of the wiring wire can be shortened, specifically, to 4 mm or less. By making the length of the wire 4 mm or less, the natural frequency of the wire is made different from the frequency of the mechanical vibration applied to the optical module, thereby preventing the resonance of the wire and preventing the wire breakage and short circuit in the wire.

(2) In the optical module of the present disclosure, the optical element is a light-receiving element, and the first optical component includes an optical demultiplexer that demultiplexes the output light from the second optical component into a plurality of wavelengths. As a result, enables a layout in which an optical demultiplexer that demultiplexes the output light from the second optical component into a plurality of wavelengths is arranged between the second optical component and the terminal unit. Moreover, even in the case of such a layout, since the second optical component and the terminal unit are electrically connected to each other by using a plurality of wirings provided on the main surface of the wiring circuit board, the length of the wiring wire can be shortened. Moreover, since a plurality of wirings are provided on the main surface of the wiring circuit board, the degree of freedom in the layout of each member can be increased by forming a plurality of electric flow paths between the second optical component and the terminal unit. In addition, the layout of each member can be reduced in space, and the length of the wiring wire can be shortened.

(3) The optical module of the present disclosure further includes a support unit that supports the wiring circuit board, in which a reflector that is optically coupled to the first optical component is arranged on the back surface of the wiring circuit board, and the optical element is arranged at a position overlapping with the reflector. As a result, the optical element can be optically coupled to the first optical component via the reflector, and the optical element can be arranged at a position overlapping with the reflector, and thus, the layout of each component can be further reduced in space and the length of the wiring wire can be shortened.

(4) In the optical module according to the present disclosure, the second optical component is an optical semiconductor amplifier or an optical attenuator. As a result, the degree of freedom in the layout of each member of the optical semiconductor amplifier or the optical attenuator can be increased. In addition, the layout of each member can be reduced in space, and the length of the wiring wire can be shortened.

(5) The optical module according to the present disclosure further includes a third optical component provided between the optical fiber and the second optical component and optically coupled to the optical fiber and the second optical component. As a result, by further arranging the third optical component that is optically coupled to the optical fiber and the second optical component between the optical fiber and the second optical component, the degree of freedom in the layout of each member can be increased. In addition, the layout of each member can be reduced in space, and the length of the wiring wire can be shortened.

(6) In the optical module according to the present disclosure, the second optical component is an optical semiconductor amplifier, and the third optical component is an optical attenuator. As a result, since the optical semiconductor amplifier and the optical attenuator can be further arranged between the optical fiber and the second optical component, the degree of freedom in the layout of each member is increased. In addition, the layout of each member can be reduced in space, and the length of the wiring wire can be shortened.

(7) An optical module according to the present disclosure includes an optical element, a first optical component that is optically coupled to the optical element, a second optical component that is optically coupled to the first optical component, a support circuit board in which the first optical component is arranged on a back surface on the opposite side of a main surface, a wiring circuit board in which wiring is provided on a main surface facing the back surface of the support circuit board, a support unit that supports the support circuit board and the wiring circuit board, a receptacle to which an optical fiber that transmits the incident light to the second optical component is connected, a terminal unit that electrically outputs an output signal of the optical element to the outside, and a package that accommodates the optical element, the first optical component, and the second optical component and is provided with the receptacle on a first surface and the terminal unit on a second surface facing the first surface, in which the wiring extends from the first surface side to the second surface side and electrically connects the second optical component and the terminal unit. As a result, since the support circuit board and the wiring circuit board can be supported by the support unit, the degree of freedom in the layout of each member can be increased. In addition, the layout of each member can be reduced in space, and the length of the wiring wire can be shortened. For example, the wiring circuit board can be arranged not only above the optical demultiplexer as the first optical component but also below the optical demultiplexer, which further improves the degree of freedom in the layout, can reduce the layout of each member in space, and shorten the length of the wiring wire.

(8) In the optical module according to the present disclosure, the back surface of the wiring circuit board on the opposite side of the main surface has a hollow structure having a gap and the bottom surface of the package. As a result, a support unit can be provided on the side surface of the optical demultiplexer, and the wiring circuit board can be freely laid out in the space between the first optical component and the bottom surface of the package. For example, by laying out the wiring circuit board in the space between the first optical component and the bottom surface of the package so as to have a hollow structure having a gap and the bottom surface of the package, the degree of freedom in the layout of each member is further increased. In addition, the layout of each member can be reduced in space, and the length of the wiring wire can be shortened.

(9) The optical module of the present disclosure further includes a temperature control device for mounting the second optical component, in which a plurality of the wirings are provided and include a First Wiring that supplies electric power to the temperature control device and a Second Wiring that supplies electric power to the second optical component and has a width narrower than that of the First Wiring. As a result, in order to minimize the power consumption of the temperature control device, it is necessary to reduce the electric resistance of the First Wiring. Therefore, the electrical resistance of the wiring pattern can be adjusted in a limited space by making the width of the Second Wiring narrower than the width of the First Wiring.

(10) The optical module of the present disclosure includes a separate wiring that is connected from the first surface side to the second surface side via a wire and is provided so as to straddle the wiring with the wire. As a result, the degree of freedom in the layout of the wiring can be greatly improved by using a separate wiring provided by straddling the wiring with a wire while using the wiring having a specific wiring pattern, and further, the length of the wiring wire can be shortened.

[Details of Embodiments of Present Invention]

Specific examples of the optical module according to the present disclosure will be described below with reference to the drawings. The present invention is not limited to the following examples and is indicated by the scope of claims, and is intended to include all modifications within the gist and scope equivalent to the scope of claims. Further, as long as a combination of a plurality of embodiments is possible, the present invention includes combinations of any embodiments. In the following description, it may be assumed that the configurations with the same reference numerals are the same in different drawings, and the descriptions thereof may be omitted.

First Embodiment

Figure 1B:
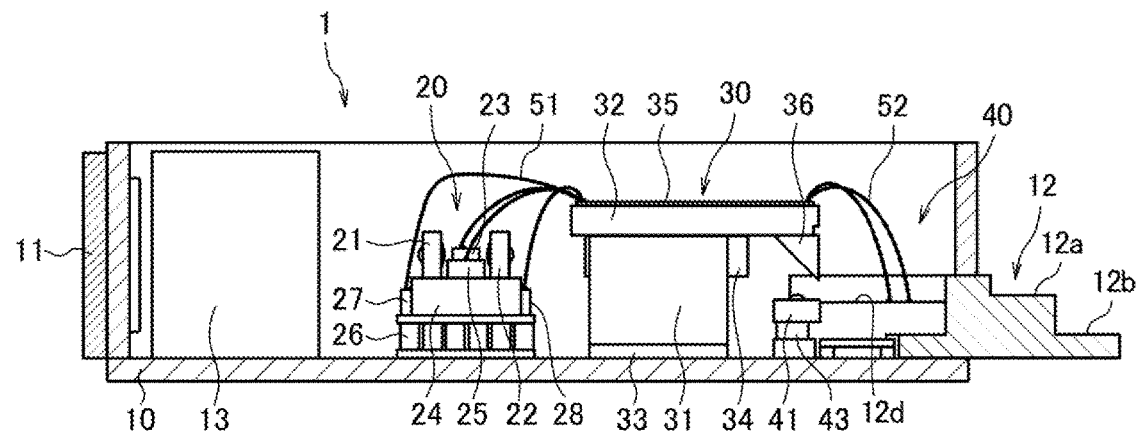
FIG. 1B is a perspective side view of the optical module shown in FIG. 1A.
Figure 1C:
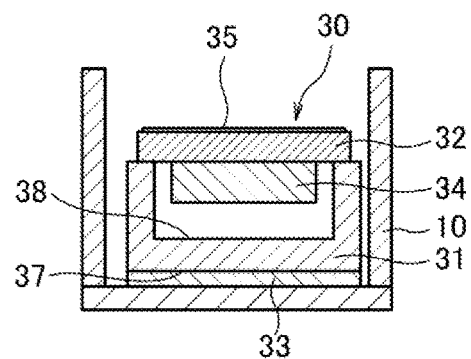
FIG. 1C is an IC-IC cross-sectional view of the optical module shown in FIG. 1A.

In the following description, as an optical module, a description will be made with an example of an optical module that receives a multiplex optical signal in which a plurality of signal light beams having different wavelengths are multiplexed, demultiplexes the multiplex optical signal into each signal light beam by an optical demultiplexer 34, and then converts each signal light beam into an electric signal. FIG. 1A is a perspective plan view of the optical module according to the first embodiment of the present disclosure and is a drawing showing the inside of a package 10 by making the upper surface of the package 10 transparent. FIG. 1B is a perspective side view of the optical module shown in FIG. 1A, and FIG. 1C is an IC-IC cross-sectional view of the optical module shown in FIG. 1A.

The optical module 1 of the present embodiment includes the package 10, an optical isolator unit 13, an optical amplification unit 20, an optical demultiplexing unit 30, a light-receiving unit 40, and a terminal unit 12. A bush 11 is provided on a first surface, which is the surface on the optical input side of the package 10. A receptacle (not shown) for connecting an optical fiber via the bush 11 is provided on the first surface of the package 10. Further, the terminal unit 12 is provided on a second surface facing the first surface. The package 10 includes a ceramic electric wiring circuit board, a metal frame, a heat sink, a light-transmitting window unit, a bush (sealing lid) 11, and the like.

The optical amplification unit 20 is provided on the second surface side of the optical isolator unit 13. The optical amplification unit 20 includes a semiconductor optical amplifier (hereinafter referred to as "SOA") 23, an SOA mounting unit 25 on which the SOA 23 is mounted, a thermistor 53 provided in the SOA mounting unit 25, an SOA lens mounting unit 24 on which the SOA mounting unit 25 are mounted, an SOA input lens 21 and an SOA output lens 22 mounted on the SOA lens mounting unit 24, a Peltier element 26 of which the SOA lens mounting unit 24 is mounted on the upper surface (the surface on the upper side of each member in the cross-sectional view such as FIG. 1B is referred to as an "upper surface"; the same applies hereinafter), and a Peltier element first terminal 27 and a Peltier element second terminal 28 provided on the Peltier element 26. The lower surface (the surface on the lower side of each member in the cross-sectional view such as FIG. 1B is referred to as "lower surface"; the same applies hereinafter) of the Peltier element 26 is fixed to the bottom surface of the package 10. The temperature of the SOA 23 is controlled by the Peltier element 26.

The optical demultiplexing unit 30 is provided on the second surface side of the optical amplification unit 20. The optical demultiplexing unit 30 is provided with a support circuit board 32 whose lower surface is supported by a support post 31, an optical demultiplexer 34 provided on the lower surface of the support circuit board 32, a prism mirror 36 provided on the optical output side of the optical demultiplexer 34 on the lower surface of the support circuit board 32, a wiring 35 provided on the upper surface of the support circuit board 32, the support post 31 having a U-shaped cross-section for supporting the lower surface of the support circuit board 32, and a base circuit board 33 on which the support post 31 are mounted. The lower surface of the base circuit board 33 is fixed to the bottom surface of the package 10. The base circuit board 33 can be omitted, and in this case, the support post 31 is fixed to the bottom surface of the package 10. Further, the bottom surface side of the support post 31 is fixed via an insulating resin. A middle stage circuit board mounting unit 38 is provided on the upper surface of the bottom of the support post 31 having a U-shaped cross-section, and a bottom surface 37 of the support post is provided on the lower surface of the bottom thereof. As the optical demultiplexer 34, for example, ODMUX can be used. ODMUX is composed of glass and a thin film filter and corresponds to the wavelength of the LAN-WDM grid.

The wiring 35 is configured by providing a metal layer on the upper surface of the support circuit board 32. The wiring 35 includes a first wiring 35a, a second wiring 35b, a third wiring 35c, a fourth wiring 35d, and a fifth wiring 35e, as a plurality of wirings extending from the first surface side to the second surface side on the upper surface of the support circuit board 32. In FIG. 1A, five wirings are shown in a straight line, but the mode of wiring is not limited thereto, and may be any number as long as the wiring is one or more, and may be a curved line or a bent line other than a straight line.

The resistance values of the first wiring 35a, the second wiring 35b, the third wiring 35c, the fourth wiring 35d, and the fifth wiring 35e are set to be reduced to a predetermined resistance value (for example, 0.1Ω) or less from the viewpoint of reducing the loss of the electric signal and reducing the heat generation.

The light-receiving unit 40 is provided on the second surface side of the optical demultiplexing unit 30. The light-receiving unit 40 includes a lens array 41 provided at a position where light is received from the prism mirror 36, a light-receiving element 43 made of, for example, a photodiode (PIN PD) provided on the lower surface of the lens array 41, and an amplification IC 42 that amplifies the output signal of the light-receiving element 43.

The terminal unit 12 is provided on the second surface side of the light-receiving unit 40 and is configured to draw an electric signal from the second surface side to the outside of the package 10. The terminal unit 12 includes a DC terminal 12a and an RF terminal 12b provided on the outside of the package 10, and an end conductive pattern 12c and a side conductive pattern 12d, provided on the inside of the package 10.

The optical amplification unit 20 and the terminal unit 12 are electrically connected to each other via the wiring 35. The land or terminal of the optical amplification unit 20 is connected to the first surface side of the wiring 35 by an input side wire 51. Further, the side conductive pattern 12d of the terminal unit 12 and the second surface side of the wiring 35 are connected to each other by an output side wire 52. The connection of the optical amplification unit 20 also includes a wire to and from a grounding land 58.

Next, the operation of the optical module according to the first embodiment of the present disclosure will be described. The four-wave multiplex optical signal from the optical fiber is converted into parallel light beam by a receptacle provided with a collimating lens and incident on the optical isolator unit 13. As the optical isolator unit 13, for example, a polarization-independent type for reducing ORL (Optical Return Loss) due to reflection from a component in the package 10 can be adopted. The four-wave multiplex optical signal incident on the optical isolator unit 13 is converged by the SOA input lens 21 and coupled to an optical waveguide of the SOA 23, and then amplified by the SOA 23. The divergent light beam emitted from the SOA 23 is converted into parallel light beam again by the SOA output lens 22, and then demultiplexed into optical signals of each wavelength by the optical demultiplexer 34. The optical signal of each wavelength demultiplexed by the optical demultiplexer 34 is converged in the light-receiving element 43 by the lens array 41 after the optical path is bent by 90 degrees by the prism mirror 36.

The light-receiving element 43 includes, for example, four photodiodes corresponding to optical signals of each wavelength, and the optical signal of each wavelength is converted into an electric signal by the light-receiving element 43. The electric signal output from the light-receiving element 43 is amplified by the amplification IC 42, for example, TIA, and is output from the RF terminal 12b to the outside of the package 10 via the end conductive pattern 12c of the terminal unit 12.

(Modification of First Embodiment)

Figure 2:
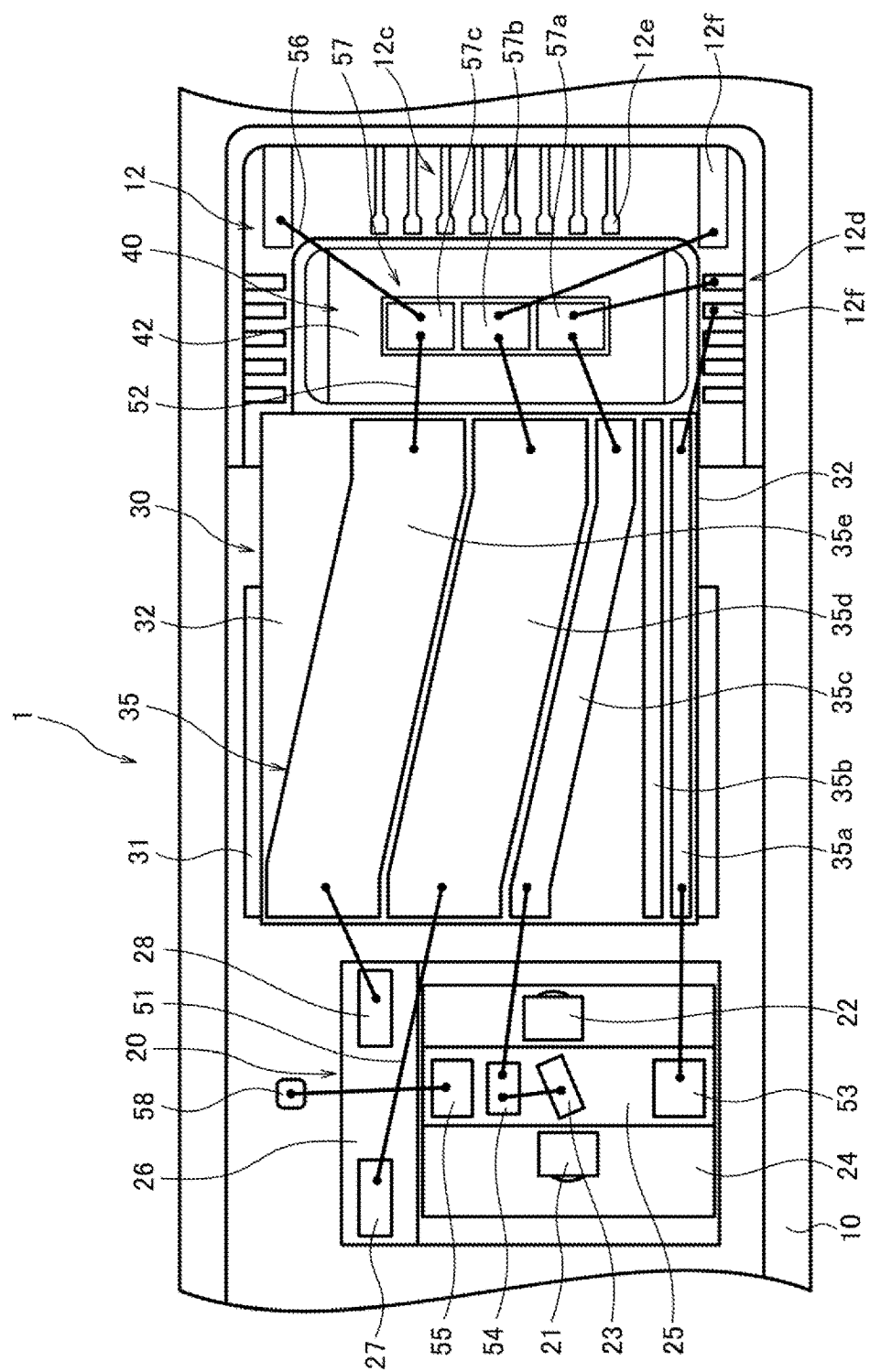
FIG. 2 is a partially enlarged view of the optical module of FIG. 1A.

A modification of the first embodiment according to the present disclosure will be described with reference to FIG. 2. FIG. 2 is a partially enlarged view of the optical module of FIG. 1A. In FIG. 1A, the wiring 35 is a straight line, but in FIG. 2, a pattern having a different width and including a bent portion is adopted.

The fourth wiring 35d and the fifth wiring 35e are widest in the width direction, then the third wiring 35c is wide, and the first wiring 35a, and the second wiring 35b are narrowest in the width direction.

The fourth wiring 35d and the fifth wiring 35e are connected to the Peltier element first terminal 27 and the Peltier element second terminal 28, respectively, and have a pattern wide enough in the width direction to transmit the electric power for cooling by the Peltier element 26.

The SOA 23 is connected to the third wiring 35c via an SOA relay land 54. By passing through the SOA relay land 54, it is possible to prevent the input side wire 51 from interfering with the SOA output lens 22, and the length of the input side wire 51 can be further shortened.

Further, an SOA ground terminal 55 is connected to the grounding land 58 provided on the bottom surface of the package 10. Further, in the present embodiment, the second wiring 35b is not used, and neither wire is connected to the second wiring 35b. The wiring that is not used can be freely selected. For example, in FIG. 1A, the third wiring 35c is not used.

The end conductive pattern 12c is provided with eight end lands 12e corresponding to, for example, four photodiodes. The side conductive pattern 12d is provided with six side lands 12f on each of both sides of the light-receiving unit 40. The side land 12f is connected to the DC terminal 12a, and the end conductive pattern 12c is connected to the RF terminal 12b. The DC terminal 12a and the RF terminal 12b are composed of a flexible circuit board, respectively and are used for connection with a transceiver circuit board (not shown).

A relay land mounting unit 57 is provided at the center of the upper surface of the amplification IC 42, and the relay land mounting unit 57 is provided with a first output side relay land 57a, a second output side relay land 57b, and a third output side relay land 57c. The third wiring 35c, the fourth wiring 35d, and the fifth wiring 35e are connected to the first output side relay land 57a, the second output side relay land 57b, and the third output side relay land 57c, respectively, by the output side wire 52. Further, the first output side relay land 57a, the second output side relay land 57b, and the third output side relay land 57c are connected to the corresponding side land 12f by a terminal side wire 56, respectively. By connecting the wires via the first output side relay land 57a, the second output side relay land 57b, and the third output side relay land 57c in this way, the displacement of the position of each land or the like in the height direction can be reduced, and the length of the output side wire 52 and the terminal side wire 56 can be further shortened. Further, since the wiring 35 can be provided on the upper surface of the support circuit board 32 of the optical demultiplexing unit 30, it is possible to reduce space in the layout of each member and increase the degree of freedom in the layout of each member. Further, even in such a layout, since the wiring can be performed using the wiring 35, the length of the wiring wire can be shortened, specifically, the length can be shortened to 4 mm or less. By making the length of the wire 4 mm or less, the natural frequency of the wiring wire is made different from the frequency of the mechanical vibration applied to the optical module, thereby preventing the resonance of the wire and preventing the wire breakage and short circuit in the wire.

The width direction dimension and the thickness direction dimension of each wiring 35 are set according to the allowable resistance value. The allowable resistance value is defined by the overall resistance value from the optical amplification unit 20 to the terminal unit 12 via each wiring 35. For the fourth wiring 35d and the fifth wiring 35e corresponding to the Peltier element 26, the overall resistance value is set to 0.1 f2 or less. In FIG. 2, the input side wire 51, the output side wire 52, and the terminal side wire 56 are shown as one wire, but actually, it is desirable to use multiple wires for the connection between the same lands in order to reduce the overall resistance value from the optical amplification unit 20 to the terminal unit 12 via each wiring 35. In the present embodiment, the inflow of heat from the optical demultiplexing unit 30 is reduced, and the electric power of the Peltier element 26 is reduced. For this reason, materials having good heat dissipation, such as alumina or aluminum nitride, are used as the materials of the support post 31 and the support circuit board 32 of the optical demultiplexing unit 30.

It is also possible to make the dimensions of each wiring 35 different. For example, in FIG. 2, the width direction dimensions of the fourth wiring 35d and the fifth wiring 35e, having a large width direction dimension, are twice or more, preferably four times or more than those of the first wiring 35a and the second wiring 35b, having a small width direction dimension. Further, the width direction dimensions of the first wiring 35a corresponding to the thermistor 53 and the third wiring 35c corresponding to the SOA 23 can be set smaller than those of the fourth wiring 35d and the fifth wiring 35e corresponding to the Peltier element 26. For example, for the third wiring 35c corresponding to the SOA 23, the resistance value is determined to allow a current of about 50 to 100 mA supplied to the SOA 23.

Second Embodiment

Figure 3A:
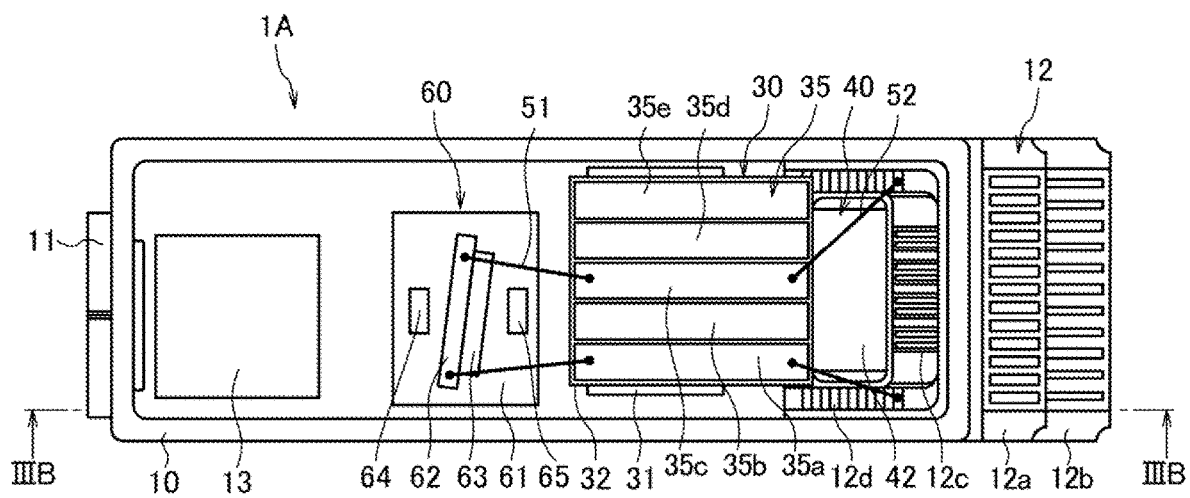
FIG. 3A is a perspective plan view of an optical module according to a second embodiment of the present disclosure.
Figure 3B:
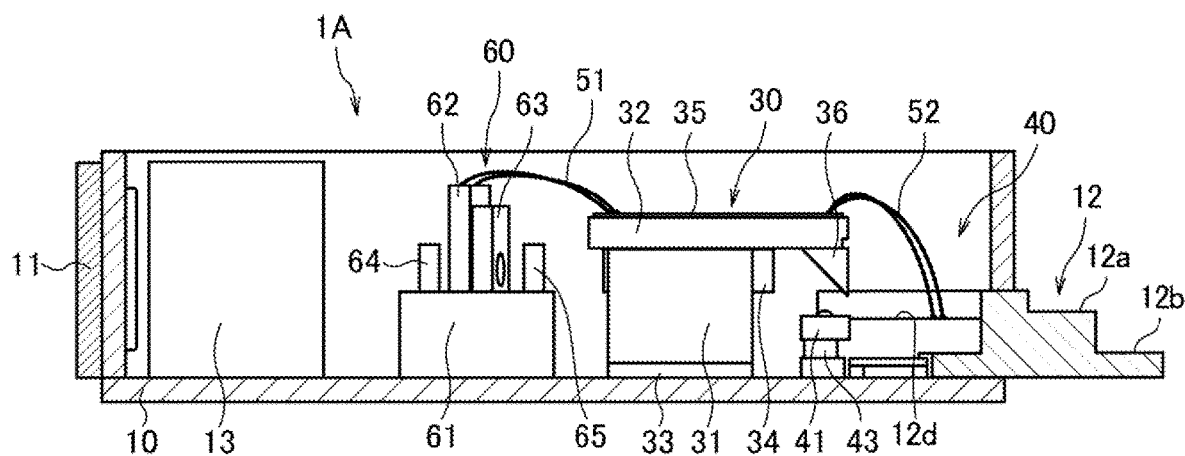
FIG. 3B is a perspective side view of the optical module shown in FIG. 3A.

An optical module 1A according to the second embodiment of the present disclosure will be described with reference to FIGS. 3A and 3B. FIG. 3A is a perspective plan view of the optical module according to the second embodiment of the present disclosure and FIG. 3B is a perspective side view of the optical module shown in FIG. 3A. The present embodiment is different from the first embodiment in that a variable optical attenuation unit 60 is provided instead of using the optical amplification unit 20.

The variable optical attenuation unit 60 includes a variable optical attenuator (hereinafter referred to as "VOA") 63, a VOA support unit 62 that supports the VOA 63, a VOA circuit board 61 on which the VOA support unit 62 and the VOA 63 are mounted, a VOA input lens 64 provided on a first surface side of the VOA 63 on the VOA circuit board 61, and a VOA output lens 65 provided on a second surface side of the VOA 63 on the VOA circuit board 61. As the VOA 63, for example, a shutter-type VOA for converging light or collimating light can be used.

The four-wave multiplex optical signal incident on the optical isolator unit 13 is converged by the VOA input lens 64 and input to the VOA 63. The optical signal is attenuated by a predetermined amount by the VOA 63 and converted into convergent light beam. After that, the optical signal diverged by passing through the VOA 63 is collected by the VOA output lens 65 and incident on the optical demultiplexer 34.

The two terminals of the VOA 63 provided on the VOA support unit 62 are connected to the first surface sides of the first wiring 35a and the third wiring 35c, respectively, by the input side wire 51. Further, the second surface sides of the first wiring 35a and the third wiring 35c are connected to the corresponding side conductive pattern 12d by the output side wire 52, respectively. In this way, by electrically connecting the terminal of the VOA 63 and the terminal unit 12 via the wiring 35, the lengths of the input side wire 51 and the output side wire 52 can be shortened. Further, by changing the mode of wiring (shape and dimensions), the degree of freedom in the layout of each component can be improved, and the layout of each member can be reduced in space.

Third Embodiment

Figure 4A:
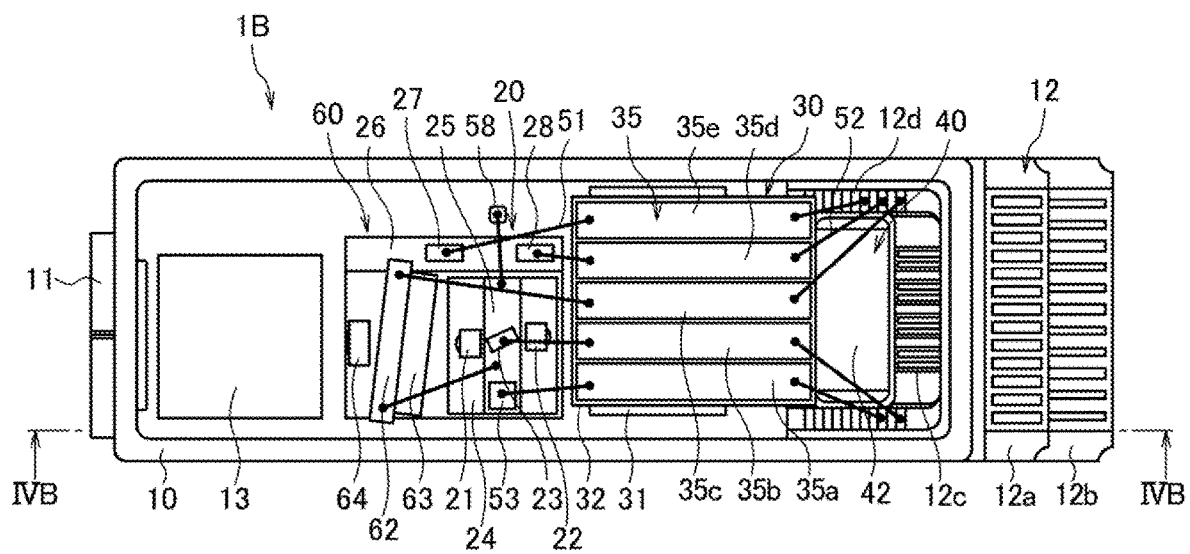
FIG. 4A is a perspective plan view of an optical module according to a third embodiment of the present disclosure.
Figure 4B:
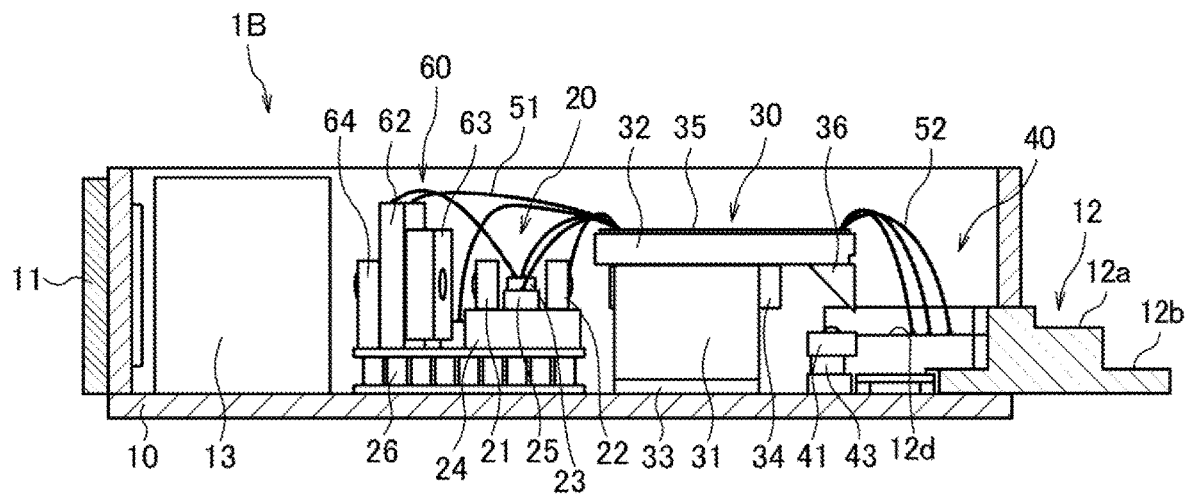
FIG. 4B is a perspective side view of the optical module shown in FIG. 4A.

An optical module 1B according to the third embodiment of the present disclosure will be described with reference to FIGS. 4A and 4B. FIG. 4A is a perspective plan view of the optical module according to the third embodiment of the present disclosure and FIG. 4B is a perspective side view of the optical module shown in FIG. 4A. The present embodiment is different from the first embodiment and the second embodiment in that both the variable optical attenuation unit 60 and the optical amplification unit 20 are provided.

In the optical module 1B according to the third embodiment, the VOA output lens 65 is omitted, and the optical amplification unit 20 and the VOA 63 are mounted on the upper surface of the common Peltier element 26 instead of providing the VOA circuit board 61.

The four-wave multiplex optical signal from the optical fiber is converted into parallel light beam by a receptacle provided with a collimating lens and incident on the optical isolator unit 13. The four-wave multiplex optical signal incident on the optical isolator unit 13 is converged by the VOA input lens 64 and input to the VOA 63. The optical signal is attenuated by a predetermined amount by the VOA 63 and converted into convergent light beam. After that, the optical signal diverged by passing through the VOA 63 is converged by the SOA input lens 21 and coupled to the optical waveguide of the SOA 23, and then amplified by the SOA 23. The divergent light beam emitted from the SOA 23 is converted into parallel light beam again by the SOA output lens 22, and then demultiplexed into optical signals of each wavelength by the optical demultiplexer 34. The optical signal of each wavelength demultiplexed by the optical demultiplexer 34 is converged in the light-receiving element 43 by the lens array 41 after the optical path is bent by 90 degrees by the prism mirror 36. Subsequent operations are the same as in the first embodiment.

Next, the connection of the wiring 35 of the present embodiment will be described. The first surface side of the third wiring 35c, which is not used in the first embodiment, is connected to one of the VOA terminals of the VOA support unit 62 by the input side wire 51. The other of the VOA terminals is connected to the common ground land unit provided in the SOA mounting unit 25 by the input side wire 51, and further, the common ground land unit is connected to the grounding land 58 by the input side wire 51. The second surface sides of the first wiring 35a, the second wiring 35b, the third wiring 35c, the fourth wiring 35d, and the fifth wiring 35e are connected to the corresponding side conductive patterns 12d by the output side wire 52, respectively. In this way, by electrically connecting each land and each terminal of the variable optical attenuation unit 60 and the optical amplification unit 20, and the terminal unit 12 via the wiring 35, the lengths of the input side wire 51 and the output side wire 52 can be shortened. Further, both the variable optical attenuation unit 60 and the optical amplification unit 20 can be provided in the package 10 having a limited dimension, and by using the wiring 35, the degree of freedom in the layout of each member can be increased.

Fourth Embodiment

Figure 5A:
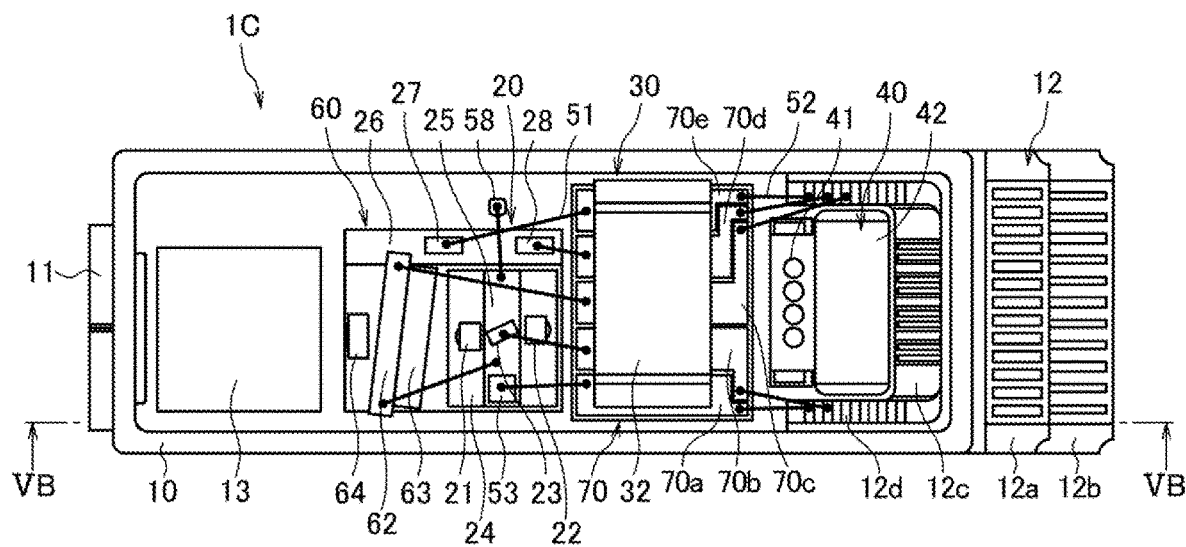
FIG. 5A is a perspective plan view of an optical module according to a fourth embodiment of the present disclosure.
Figure 5B:
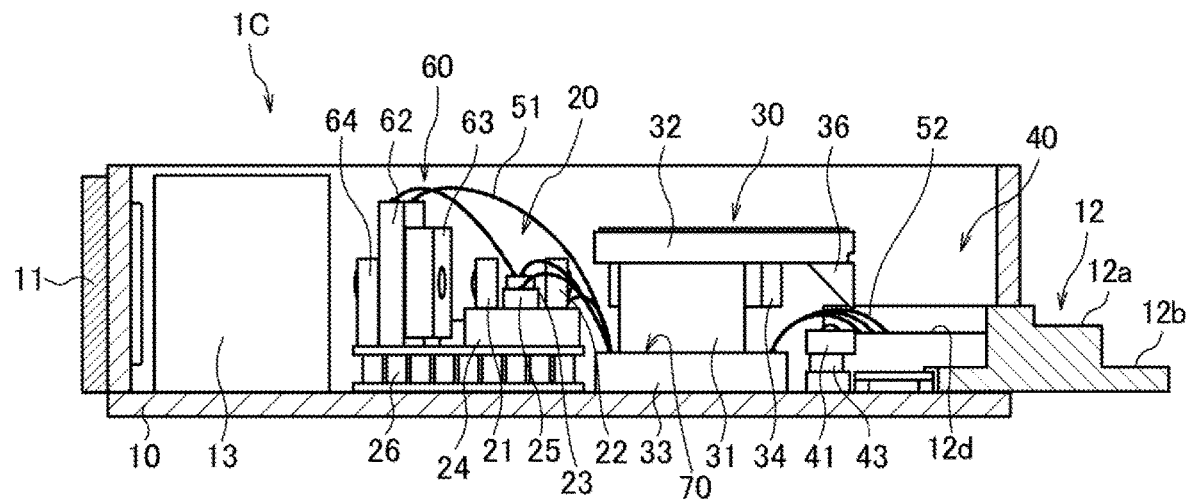
FIG. 5B is a perspective side view of the optical module shown in FIG. 5A.

An optical module 1C according to the fourth embodiment of the present disclosure will be described with reference to FIGS. 5A and 5B. FIG. 5A is a perspective plan view of the optical module according to the fourth embodiment of the present disclosure. FIG. 5A is a drawing in which the support circuit board 32 and the optical demultiplexer 34 are shown in perspective so that the wiring can be seen. FIG. 5B is a perspective side view of the optical module shown in FIG. 5A and is a drawing showing the support circuit board 32 and the optical demultiplexer 34 included. The present embodiment is different from the third embodiment in that a wiring 70 is provided on the upper surface of the base circuit board 33 facing the bottom surface 37 of the support post. As shown in FIG. 5A, a first wiring 70a, a second wiring 70b, a third wiring 70c, a fourth wiring 70d, and a fifth wiring 70e have a pattern on the second surface side so that the land unit for connecting the output side wire 52 is concentrated on one end in the width direction. As a result, the land unit for connecting the output side wire 52 approaches the side conductive pattern 12d, and thus, the length of the output side wire 52 can be further shortened.

In the optical module 1C according to the fourth embodiment, since the wiring 70 is provided on the upper surface of the base circuit board 33 facing the bottom surface 37 of the support post (see FIG. 1C), the position of the wiring in the height direction can be adjusted by the thickness of the base circuit board 33, and thus, the length of the wire can be further shortened. Further, by positioning the wiring in the height direction, the degree of freedom in the layout of each member can be increased and the layout of each member can be reduced in space. Further, since the wiring circuit board can be arranged on the bottom surface of the package 10, the width of the wiring circuit board can be widened.

Fifth Embodiment

Figure 6A:
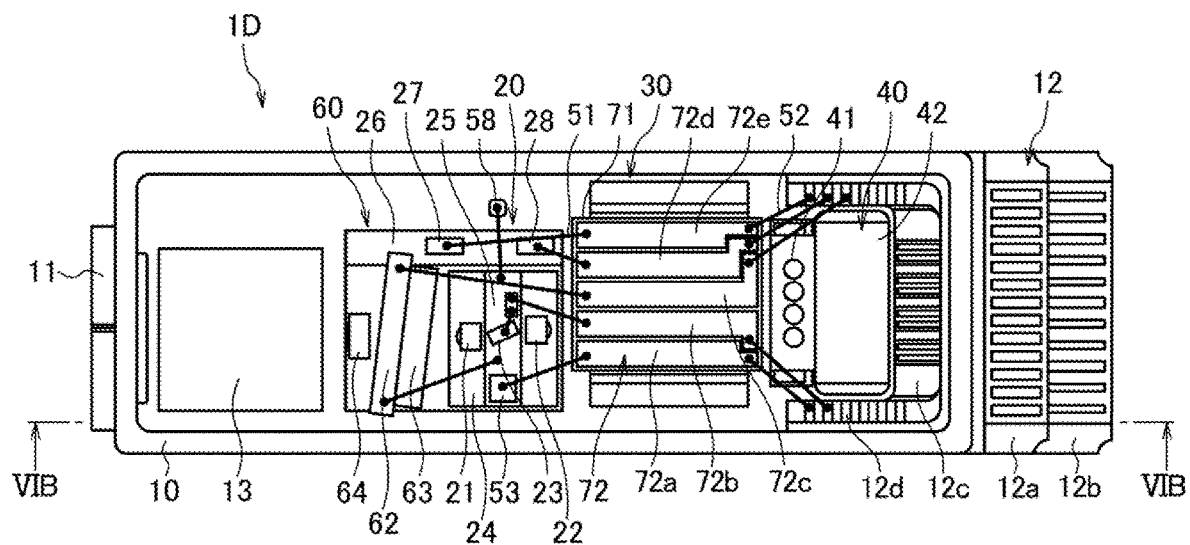
FIG. 6A is a perspective plan view of an optical module according to a fifth embodiment of the present disclosure.
Figure 6B:
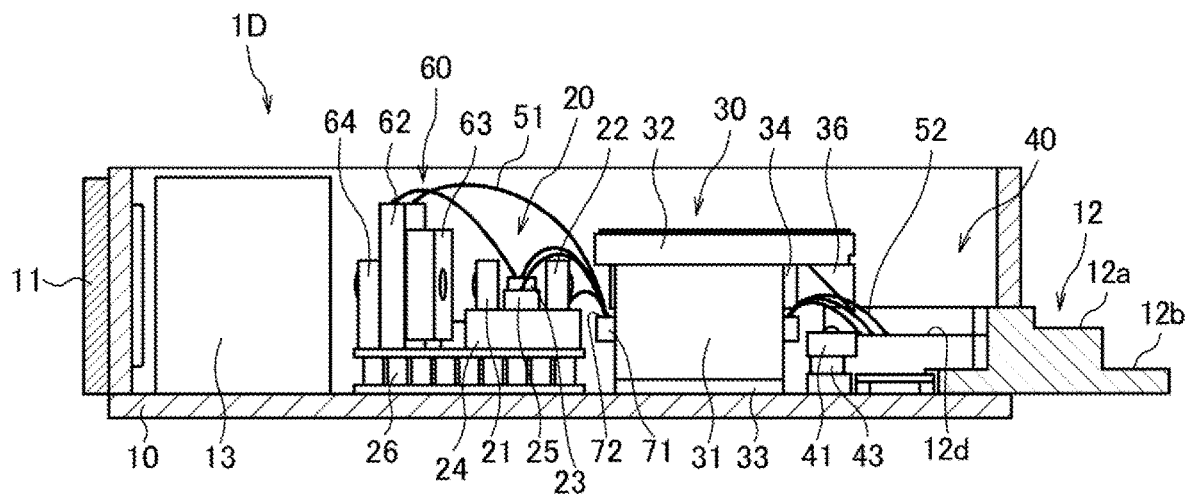
FIG. 6B is a perspective side view of the optical module shown in FIG. 6A.

An optical module 1D according to the fifth embodiment of the present disclosure will be described with reference to FIGS. 6A and 6B. FIG. 6A is a perspective plan view of the optical module according to the fifth embodiment of the present disclosure and FIG. 6A is a drawing in which the support circuit board 32 and the optical demultiplexer 34 are shown in perspective so that the wiring can be seen. FIG. 6B is a perspective side view of the optical module shown in FIG. 6A and is a drawing showing the support circuit board 32 and the optical demultiplexer 34 included. The present embodiment is different from the third embodiment in that a wiring 72 is provided on the upper surface of a middle stage circuit board 71 mounted on the middle stage circuit board mounting unit 38 of the support post 31. As shown in FIG. 6A, a first wiring 72a, a second wiring 72b, a third wiring 72c, a fourth wiring 72d, and a fifth wiring 72e have a pattern on the second surface side so that the land unit for connecting the output side wire 52 is concentrated on one end in the width direction. As a result, the land unit for connecting the output side wire 52 approaches the side conductive pattern 12d, and thus, the length of the output side wire 52 can be further shortened.

In the optical module 1D of the present embodiment, since the wiring 72 is provided on the upper surface of the middle stage circuit board 71 mounted on the middle stage circuit board mounting unit 38 (see FIG. 1C) of the support post 31, the height position where the wire is pulled out from the wiring 72 can be brought closer to the height position where the wire is pulled out from each component, and thus, the length of the wire can be shortened. In addition, by setting the height position of the wiring 72, it is possible to reduce space in the layout of each component, shorten the length of the wiring wire, and further improve the degree of freedom in the layout of the wiring circuit board. The middle stage circuit board 71 may be arranged so as to provide a gap between the middle stage circuit board 71 and the middle stage circuit board mounting unit 38.

Sixth Embodiment

Figure 7A:
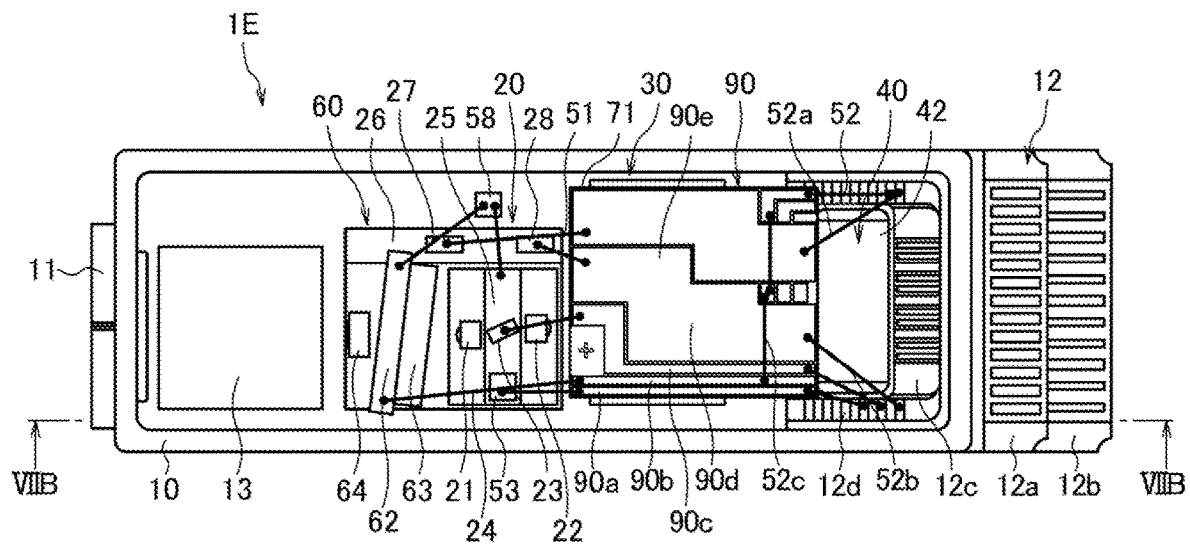
FIG. 7A is a perspective plan view of an optical module according to a sixth embodiment of the present disclosure.
Figure 7B:
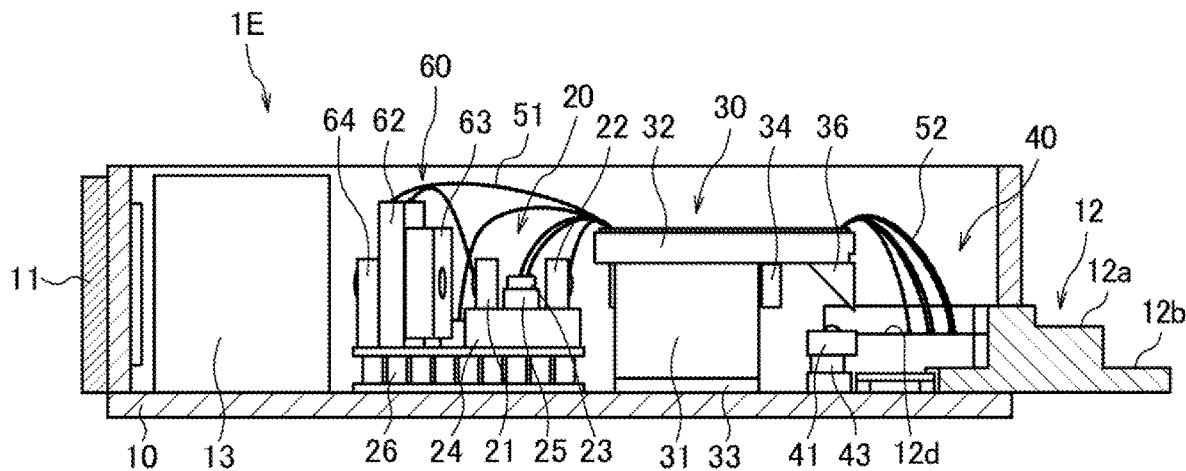
FIG. 7B is a perspective side view of the optical module shown in FIG. 7A.
Figure 8:
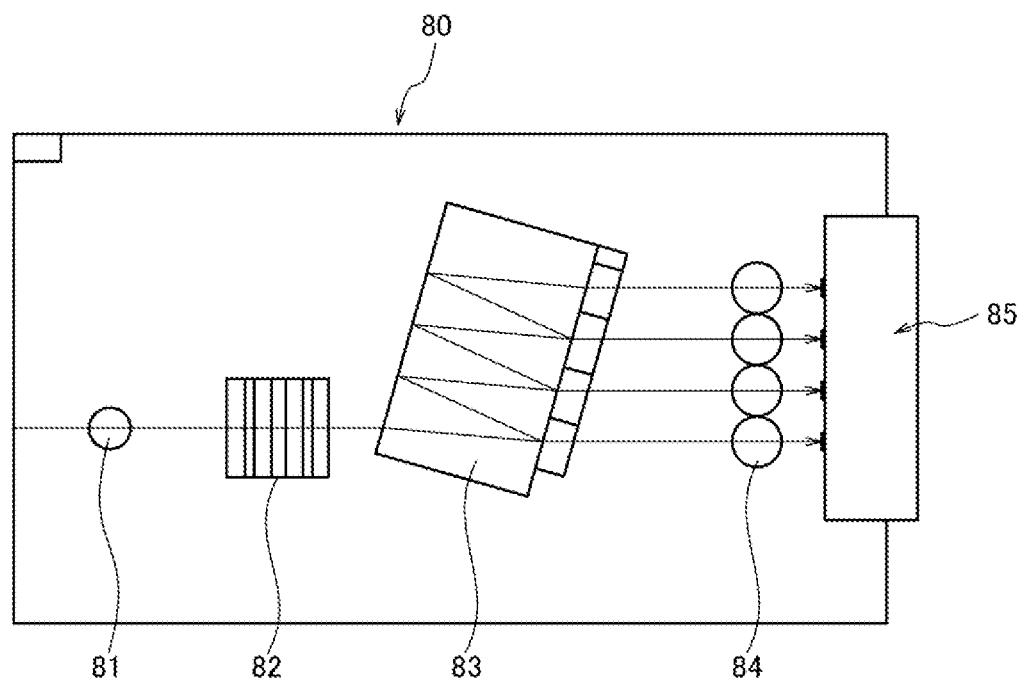
FIG. 8 is a diagram illustrating a related art.

An optical module 1E according to the sixth embodiment of the present disclosure will be described with reference to FIGS. 7A and 7B. FIG. 7B is a perspective side view of the optical module shown in FIG. 7A and is a drawing showing the support circuit board 32 and the optical demultiplexer 34 included. In the present embodiment, the pattern of the wiring 35 is changed as compared with the optical module 1B of the third embodiment described with reference to FIGS. 4A and 4B. The same reference numerals are provided for the same configuration as in the third embodiment, and the descriptions thereof will be omitted.

In the optical module 1E of the present embodiment, a wiring 90 has a different pattern as compared with the optical module 1B of the third embodiment and is provided with a first wiring 90a connected to the thermistor 53, a second wiring 90b and the third wiring 90c for supplying electric power to each element of the variable optical attenuation unit 60 and the optical amplification unit 20 as the second optical component, and a fourth wiring 90d and a fifth wiring 90e as the First Wiring for supplying electric power to the Peltier element 26 as the temperature control device. The widths of the first wiring 90a, the second wiring 90b, and the third wiring 90c as the Second Wiring are narrower than those of the fourth wiring 90d and the fifth wiring 90e as the First Wiring.

In order to minimize the power consumption of the Peltier element 26, which is a temperature control device, it is necessary to reduce the electrical resistance of the wiring of the fourth wiring 90d and the fifth wiring 90e connected to the Peltier element first terminal 27 and the Peltier element second terminal 28, respectively. Therefore, by making the widths of the wiring of the fourth wiring 90d and the fifth wiring 90e as the First Wiring wider than those of the first wiring 90a, the second wiring 90b, and the third wiring 90c as the Second Wiring, the electrical resistance of the First Wiring was reduced in the limited installation space of the wiring 90.

The wiring 90 and each element, or the wiring wires connecting the wirings, are composed of the input side wire 51 and the output side wire 52, and the output side wire 52 is composed of one side surface side wire 52a, the other side surface side wire 52b, and an inter-wiring wire 52c. By providing the inter-wiring wire 52c, the degree of freedom in the layout of the wiring can be significantly improved, and the length of the wiring wire can be shortened. As a result, even when the wiring 90 has a specified wiring pattern, that is, the wiring 90 is wiring commonly used for the optical modules 1E having different specifications, by using the inter-wiring wire 52c as a separate wiring provided by straddling the wiring with wires, the wiring wire used between the wiring 90 and the land can be shortened for both the land to which the one side surface side wire 52a is wired and the land to which the other side surface side wire 52b is wired.

The wiring 90 is provided with a plurality of wiring land units, and by using the wiring land units, the inter-wiring wire 52c is connected so as to straddle the other wiring, and it is possible to connect to the land to which the one side surface side wire 52a is wired and to the land to which the other side surface side wire 52b is wired with a wiring wire having a short wiring length. In the example of FIG. 7A, the positive side terminal of the VOA 63 is connected to the second wiring 90b via the input side wire 51, and further, the wiring is performed from the second wiring 90b to the land to which the one side surface side wire 52a is wired via the inter-wiring wire 52c and a plurality of wiring land units. In this way, even when the wiring pattern of the wiring 90 is such that the first wiring 90a, the second wiring 90b, and the third wiring 90c as the Second Wiring for supplying electric power to each element are arranged to be concentrated on the land to which the other side surface side wire 52b is wired, a wiring wire having a short wiring length can be used to connect to the land to which the one side surface side wire 52a arranged from the opposite side surface is wired, by using the inter-wiring wire 52c and a plurality of wiring land units.

Seventh Embodiment

An optical module 1F according to the seventh embodiment of the present disclosure will be described. The optical module 1F of the present embodiment is different from the first to sixth embodiments in that a light-emitting element 43a is used as the optical element instead of the light-receiving element 43. In the optical module 1F of the present embodiment, a surface light-emitting element, for example, a VCSEL is used as the light-emitting element 43a. Further, the optical module 1F of the present embodiment includes an optical multiplexing unit 30 including an optical multiplexer that multiplexes the light output from the plurality of light-emitting elements 43a, instead of the optical demultiplexing unit 30.

An example of the present embodiment will be described in comparison with the first embodiment shown in FIGS. 1A to 1C. The light-emitting element control IC controls the light emission of the light-emitting element 43a based on the signal from the terminal unit 12. The light output from the plurality of light-emitting elements 43a is multiplexed in the optical multiplexing unit 30 as the first optical component, sent to the optical amplification unit 20 which is the second optical component, and amplified. The multiplexed and amplified light is output to the optical fiber via the receptacle connected to the bush 11 via the output unit 13.

The wiring 35 provided on the upper surface of the support circuit board 32 of the optical multiplexing unit 30 includes the first wiring 35a, the second wiring 35b, the third wiring 35c, the fourth wiring 35d, and the fifth wiring 35e, as in the first embodiment. Drive power or a control signal is supplied from the side conductive pattern 12d to each unit of the optical amplification unit 20 as the second optical component via the wiring 35. As a result, the optical amplification unit 20 as the second optical component and the terminal unit 12 can be electrically connected to each other by using the wiring extending from the first surface side to the second surface side to electrically connect the second optical component and the terminal unit 12. Therefore, the layout can be such that the light-emitting element 43a as the first optical component is arranged between the second optical component and the terminal unit 12, and the layout of each member can be reduced in space. Further, even in such a layout, since the second optical component and the terminal unit 12 are electrically connected to each other by using wiring, the length of the wiring wire can be shortened, specifically, to 4 mm or less. By making the length of the wire 4 mm or less, the natural frequency of the wire is made different from the frequency of the mechanical vibration applied to the optical module, thereby preventing the resonance of the wire and preventing the wire breakage and short circuit in the wire.

Further, the arrangement of the wiring 35 is not limited to that of FIG. 1A mentioned in the first embodiment, and various arrangements of the wiring 35 and various patterns of the wiring 35 described in the second to sixth embodiments can be adopted. In the present embodiment, since the example in which the optical element is the light-emitting element 43a is described with reference to FIGS. 1A to 1C, the arrangement of the SOA input lens 22 and the SOA output lens 21, or the like is different from that of other embodiments, and other optical elements necessary for multiplexing, amplifying, and outputting the light output from the light-emitting element 43a to the optical fiber can also be provided.

As described above, from the description of each embodiment of the present disclosure, it is clear that the following effects can be obtained: the degree of freedom in the layout of each member including the optical element in the optical module is increased, the layout of each member can be reduced in space, and the length of the wiring wire can be shortened. Further, the present disclosure is not limited to these embodiments but includes a combination of the embodiments and a modification of the layout of each component in the embodiments.

What is claimed is:

1. An optical module comprising:
an optical element;
a first optical component that is optically coupled to the optical element;
a second optical component that is optically coupled to the first optical component;
a wiring circuit board in which wiring is provided on a main surface thereof and the first optical component is arranged on a back surface on the opposite side of the main surface;
a receptacle to which an optical fiber that transmits an incident light to the second optical component is connected;
a terminal unit that electrically outputs an output signal of the optical element; and
a package that accommodates the optical element, the first optical component, and the second optical component and is provided with the receptacle on a first surface and the terminal unit on a second surface facing the first surface, wherein
the wiring extends from the first surface to the second surface and electrically connects the second optical component and the terminal unit, and wherein
the optical element is a light-receiving element, and the first optical component includes an optical demultiplexer that demultiplexes the output light from the second optical component into a plurality of wavelengths.

2. The optical module according to claim 1, further comprising:
a support unit that supports the wiring circuit board, wherein
a reflector that is optically coupled to the first optical component is arranged on the back surface of the wiring circuit board, and the optical element is arranged at a position overlapping with the reflector.

3. The optical module according to claim 1, further comprising:
a third optical component provided between the optical fiber and the second optical component and optically coupled to the optical fiber and the second optical component.

4. The optical module according to claim 3, wherein
the second optical component is an optical semiconductor amplifier, and the third optical component is an optical attenuator.

5. The optical module according to claim 1, further comprising:
a temperature control device for mounting the second optical component, wherein a plurality of the wirings are provided and include a First Wiring that supplies electric power to the temperature control device and a Second Wiring that supplies electric power to the second optical component and has a width narrower than that of the First Wiring.

6. The optical module according to claim 1, further comprising:
a separate wiring that is connected from the first surface side to the second surface side via a wire and is provided so as to straddle the wiring with the wire.

7. An optical module comprising:
an optical element;
a first optical component that is optically coupled to the optical element;
a second optical component that is optically coupled to the first optical component;
a wiring circuit board in which wiring is provided on a main surface thereof and the first optical component is arranged on a back surface on the opposite side of the main surface;
a receptacle to which an optical fiber that transmits an incident light to the second optical component is connected;
a terminal unit that electrically outputs an output signal of the optical element; and
a package that accommodates the optical element, the first optical component, and the second optical component and is provided with the receptacle on a first surface and the terminal unit on a second surface facing the first surface, wherein
the wiring extends from the first surface to the second surface and electrically connects the second optical component and the terminal unit, wherein the second optical component is an optical semiconductor amplifier or an optical attenuator.

8. An optical module comprising:
an optical element;
a first optical component that is optically coupled to the optical element;
a second optical component that is optically coupled to the first optical component;
a support circuit board in which the first optical component is arranged on a back surface on the opposite side of a main surface;
a wiring circuit board in which wiring is provided on a main surface facing the back surface of the support circuit board;
a support unit that supports the support circuit board and the wiring circuit board;
a receptacle to which an optical fiber that transmits an incident light to the second optical component is connected;
a terminal unit that electrically outputs an output signal of the optical element; and
a package that accommodates the optical element, the first optical component, and the second optical component and is provided with the receptacle on a first surface and the terminal unit on a second surface facing the first surface, wherein
the wiring extends from the first surface to the second surface and electrically connects the second optical component and the terminal unit.

9. The optical module according to claim 8, wherein the back surface of the wiring circuit board on the opposite side of the main surface has a hollow structure having a gap and the bottom surface of the package.

* * * * *